Nov. 16, 1965 W. FLIEG ETAL 3,218,631

CODE CONVERTER

Filed Dec. 14, 1962 5 Sheets-Sheet 1

INVENTORS
WERNER FLIEG
RALPH BERGER

BY

ALAN K. ROBERTS
ATTORNEY

INVENTORS
WERNER FLIEG
RALPH BERGER
BY
ALAN K. ROBERTS
ATTORNEY

Nov. 16, 1965 W. FLIEG ETAL 3,218,631

CODE CONVERTER

Filed Dec. 14, 1962 5 Sheets-Sheet 3

INVENTORS
WERNER FLIEG
RALPH BERGER

BY

ALAN. K. ROBERTS
ATTORNEY

INVENTORS
WERNER FLIEG
RALPH BERGER
BY
ALAN K. ROBERTS
ATTORNEY

Nov. 16, 1965 W. FLIEG ETAL 3,218,631

CODE CONVERTER

Filed Dec. 14, 1962 5 Sheets-Sheet 5

INVENTORS
WERNER FLIEG
RALPH BERGER

BY

ALAN K. ROBERTS
ATTORNEY

United States Patent Office 3,218,631

Patented Nov. 16, 1965

3,218,631

CODE CONVERTER

Werner Flieg, 56 Stearns St., Newton Center, Mass., and Ralph Berger, 6 Wingate Road, Wellesley, Mass.

Filed Dec. 14, 1962, Ser. No. 244,732

5 Claims. (Cl. 340—347)

This invention relates to apparatus and techniques for converting representations of intelligence in one code into representations in a different code.

In the field of data processing, it is customary to represent and manipulate data in encoded form. Some typical forms which this technique has evolved include punched paper tapes, punched cards, magnetically coded sheets and so forth.

The simultaneous development, in data processing, of different techniques and apparatus has unfortunately resulted in the use of different codes. Therefore, it sometimes occurs that recorded data is not in a form which can be used by the apparatus which is to process this data.

It is an object of the invention, taking into account the above problem, to provide apparatus and techniques for efficiently and economically converting data from one code to another.

The solution to the problem encounters a difficulty in that numerous codes are involved which tend to make necessary conversion apparatus and techniques of a very sophisticated and therefore expensive type.

It is an object of the invention, however, to provide for the ready adaptation between codes of different types and in a manner which is both facile and of low cost.

One of the more significant problems in data processing is that of maintaining reliability in the sense that errors cannot be tolerated.

In this regard, an object of the invention is to provide its solution to the code conversion problem in such a manner as to enable code conversion substantially free from the possibility of the introduction of errors.

Still another essential characteristic of data handling apparatus is that it be capable of operating over substantial periods of time without breaking down.

Accordingly, the proposals herein made in accordance with the invention are intended to respect fully the need for apparatus capable of operating unsupervised for prolonged periods of time.

Generally in accordance with the invention there is contemplated the provision of means for cyclically generating a sequence of electrical signals representing a sequence of characters encoded according to a predetermined code and means coupled to the first said means for cyclically generating a sequence of electrical signals representing the aforesaid sequence of characters according to a different code; additionally means are provided which are coupled to the aforesaid means and which are responsive to the identity between an externally applied signal representing one of the aforesaid characters in one of said codes and a signal from one of the first said means to select a corresponding signal in the other of the codes.

Viewed from another aspect, the invention contemplates providing means for generating two sequences of signals respectively representing a sequence of characters encoded in different codes with means being provided to compare one of the sequences of signals with a signal representing one of the aforesaid characters encoded in one of said codes to control transmitting the corresponding signal in the other of the codes.

As to the methods and techniques of the invention, these relate generally to the simultaneous generation of two sequences of electrical signals representing a sequence of characters in two codes, comparing a signal representing one of these characters in one of said codes with the sequence of signals representing the corresponding code, and upon detecting an identity of the thusly compared signals, selecting a signal from the other sequence.

According to a feature of the invention, the sequences of electrical signals which are generated originate in photoelectric apparatus. Photoelectric apparatus is employed for purposes of reliability with respect to the generation of signals and because such apparatus is capable of operating over prolonged periods with little danger of failure.

According to a further feature of the invention, discs having coded arrangements of holes are employed in said photoelectric apparatus in combination with a source of rotary power adapted to enable the generation of evenly spaced electrical signals.

According to a specific embodiment of the invention, two discs are mounted on a single rotatable shaft, the discs being provided with corresponding radial alignments of coded combinations of holes adapted to control the generation of electrical signals in associated photoelectric devices. At least one of these discs is detachable so that it can be replaced readily by a substitute disc having alignments of holes therein according to a further code.

Other features and objects of the invention, as well as advantages thereof, will be apparent from the following detailed description of a preferred embodiment as illustrated in the accompanying drawing in which.

Figure 1:
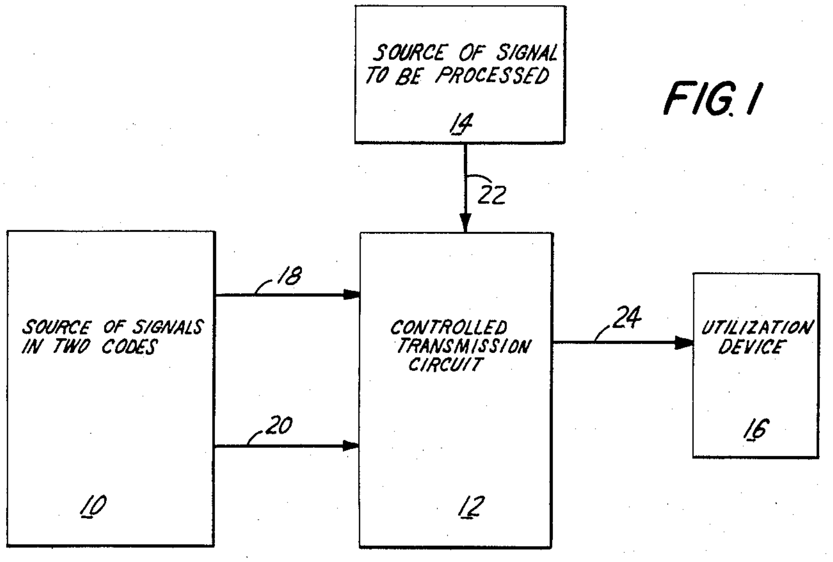
FIGURE 1 is a block diagram illustrating the general principle employed by the invention.

The block diagram of FIG. 1 illustrates the two basic elements 10 and 12 directly involved in the invention in association with further elements which may be considered to be either directly or indirectly related to the invention according to the circumstances.

Element 10 is a source of signals in two codes, one of said signals being transmitted via line 18 to element 12 and the other signal being transmitted to element 12 via line 20.

Each signal is an electrical signal, either serially arranged or in parallel, and constituted preferably by two voltage magnitudes, one of which represents the presence of a binary digit and the other of which represents the absence of a binary digit. One signal may, for example, be a coded representation of a character in a code employed in one type of apparatus and the other signal may represent a character representing the same character coded in a code suitable for use in a different type of apparatus.

One of these codes corresponds to the code employed in element 14 which may be generally considered as being a source of the signal to be processed or code-converted. In other words, the signal generated in element 14 is the coded representation of a character which is to be represented by a signal representing the same character in another code. Element 14 transmits its signal via line 22 to the element 12 which is a controlled transmission circuit.

Element 12 functions to compare the signal received via line 22 with the signal received, for example, via line 18. When it is determined that these two signals correspond or are identical, the signal received via line 20 is transmitted from element 12 via line 24 to element 16. Element 16 is a utilization device requiring an input signal in the second of the codes.

By way of further illustration, source 14 may be a punched paper tape reader or a typewriter adapted for generating electrical signals representative of the characters being typed.

On the other hand, element 16 may be a tape punch, or a computer, or the like.

Figure 2:
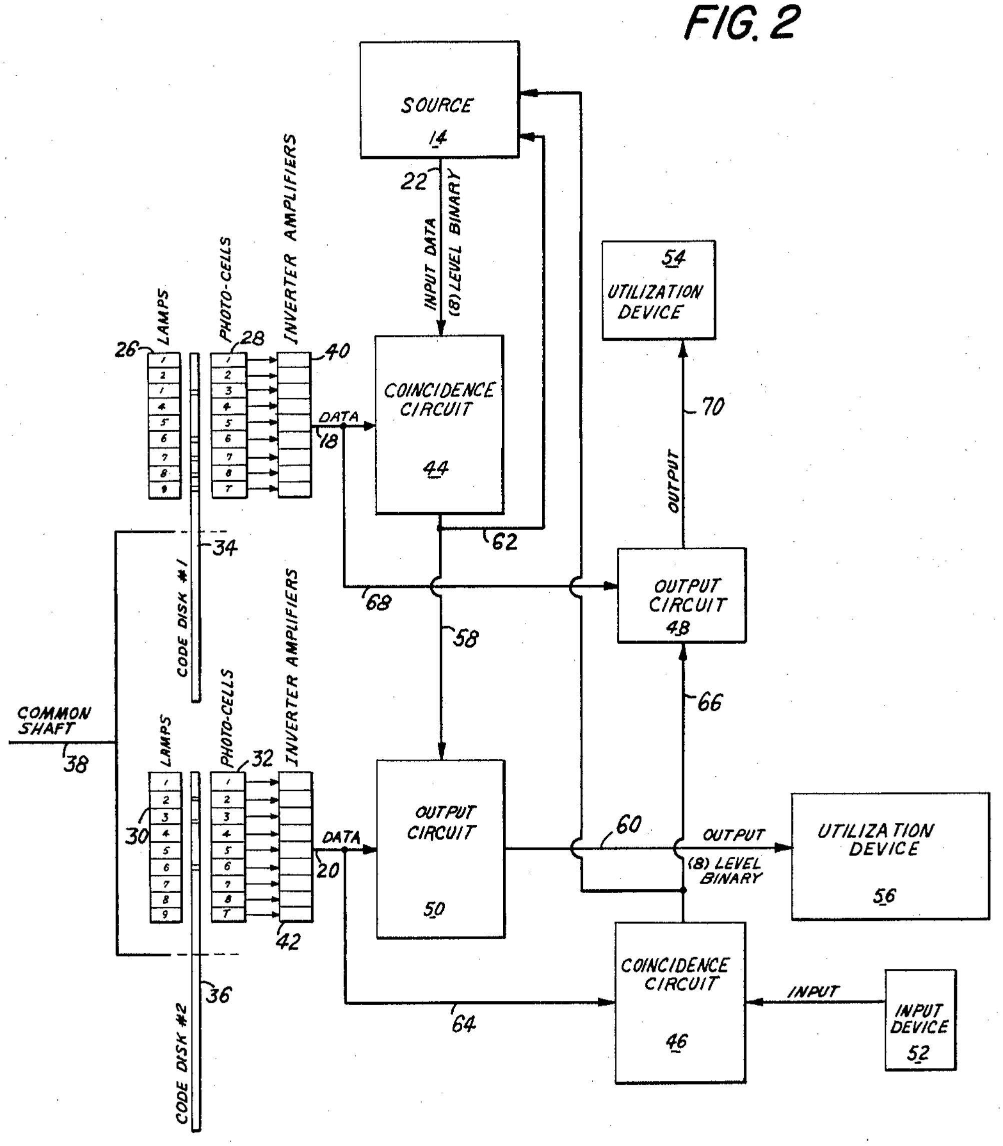
FIGURE 2 is a further block diagram illustrating a development of the block diagram of FIG. 1 in accordance with the invention.

In the more sophisticated development of FIG. 2, element 10 is shown as being constituted by sets of photoelectric devices and components associated therewith to control the generation of signals.

More particularly, element 10 comprises a series 26 of lamps, or other sources of light or radiated energy, a series 28 of light responsive devices associated therewith in spaced relation, a second series 30 of lamps and a second series 32 of light responsive devices associated with and spaced from series 30. Element 10, moreover, comprises components 34 and 36 which are light impermeable elements adapted for selectively isolating the light sources from the associated light responsive devices, there being provided in elements 34 and 36 coded arrangements of holes which provide for the generation of coded signals, as will be explained in greater detail hereinafter.

FIG. 2 illustrates the preferred embodiment of the invention in accordance with which elements 34 and 36 are connected in common to a driving mechanism 38 which operates elements 34 and 36 in synchronism.

The signals generated by the light responsive devices included in the series 28 and 32 may be respectively amplified by amplifier banks 40 and 42 wherefrom the signals are transmitted via lines 18 and 20 as aforesaid.

FIG. 2 illustrates further that the element 12 (of FIG. 1) comprises, for example, coincidence circuits 44 and 46 and output circuits 48 and 50. Coincidence circuits 44 and 46 may be any conventional type of circuit adapted for comparing two input signals of the binary type.

With respect to the aforesaid coincidence and output circuits, it can be assumed, for example, that output circuit 48 and coincidence circuit 46 are inoperative for, in fact, these circuits represent alternate possibilities of employing the illustrated apparatus. Similarly, the input device 52 coupled to coincidence circuit 46 can also be considered as illustrative of an alternative manner of using the illustrated apparatus as will become hereinafter apparent.

Also, of the two utilization devices 54 and 56 which are illustrated, only the utilization device 56 will be explained in detail inasmuch as the utilization device 54 similarly is illustrative of an alternative application of the apparatus.

In operation, two signals are transmitted via lines 18 and 20 from the sets of light responsive devices 28 and 32, one signal being the coded representation of intelligence according to one code and the other signal being the coded representation of intelligence according to a second code. Source 14 supplies to the coincidence circuit 44 via line 22 a signal representative of a character encoded in the code corresponding to that of the signal received in coincidence circuit 44 via line 18.

Output circuit 50 receives a signal via line 20 representative of characters encoded in a different code. Assuming, as will be explained in greater detail hereinafter, that a sequence of signals representing a series of characters is transmitted via line 18 to coincidence circuit 44 and that the signal received in coincidence circuit 44 via line 22 represents one of these characters, the coincidence circuit 44 will eventually be enabled to detect an identity between the signals being compared. This will provide for the transmission of a control signal via line 58 to the output circuit 50. Output circuit 50, in the meantime, receives a sequence of signals representing the same sequence of characters as aforesaid but encoded in a different code as has been noted above. These signals are blocked by output circuit 50 excepting when circuit 50 is primed by a signal received via line 58 to gate or transmit the signal received from line 20.

It will be appreciated from what has been stated above that should a predetermined and appropriate relationship be established between the signals on lines 18 and 20, it will be possible to select one of the sequence of signals on line 20 which represents the same character as that represented by the signal on line 22 and that a code conversion can thus be appropriately effected.

The signal representing the code conversion may be transmitted via line 60 to the utilization device 56 adapted to receive this code. Also, the signal on line 58 may be transmitted via line 62 back to the source 14 to enable the same to supply the next sequential coded signal to be converted.

The conversion between lines 18 and 20 can be reversed, in which event the input device 52 substitutes for source 14 and supplies a signal which is compared in coincidence circuit 46 with the sequence of signals received by circuit 46 via line 64. Coincidence circuit 46 controls circuit 48 by means of a control signal transmitted via line 66 and the output of circuit 48 is derived from line 68 and is selectively transmitted via line 70 to the utilization device 54.

An electrical and mechanical system embodying the principles and characteristics of the apparatus described above is illustrated in FIGURES 3–7.

Figure 3:
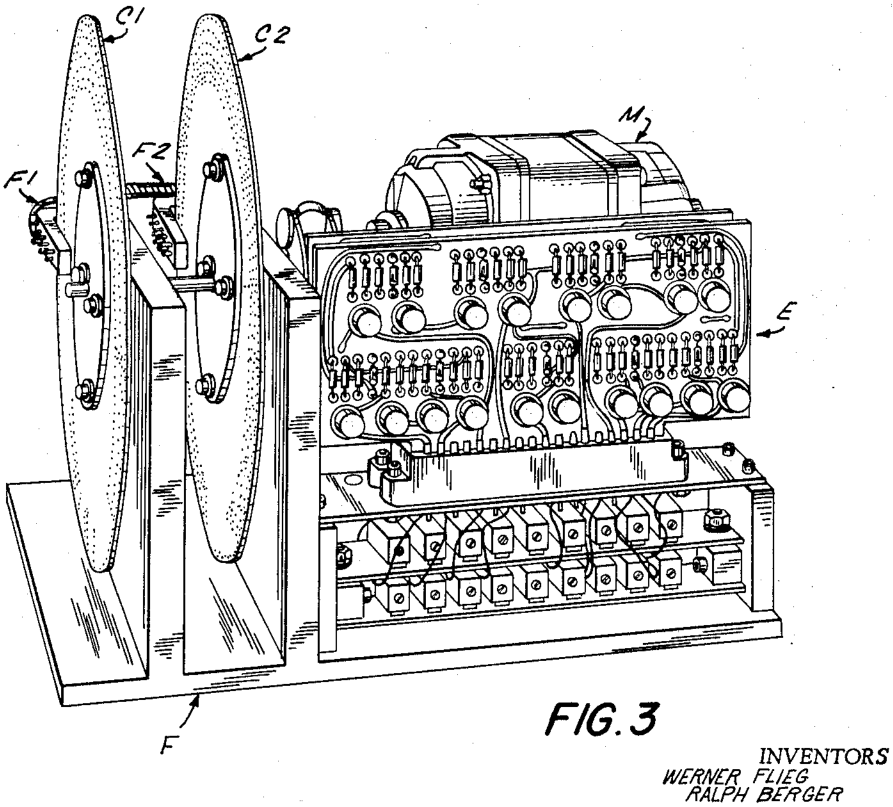
FIGURE 3 is a pictorial view of a preferred embodiment of the invention involving the use of rotatable discs in combination with photoelectric devices.

Referring first to the pictorial view of FIG. 3, it is seen that the apparatus comprises generally a frame F on which is mounted a motor M, electrical circuits E, photoelectric devices F1 and F2 and coded devices C1 and C2, the coded devices having coded series of holes and having a predetermined geometric relationship as will become apparent hereinafter.

As shown in FIGS. 4–7, the frame consists of a bottom plate 80 upon which are fixed two spaced vertical plates 82 and 84. Bottom plate 80 is provided with a plurality of adjustable supports 86, one at each corner thereof.

Figure 5:
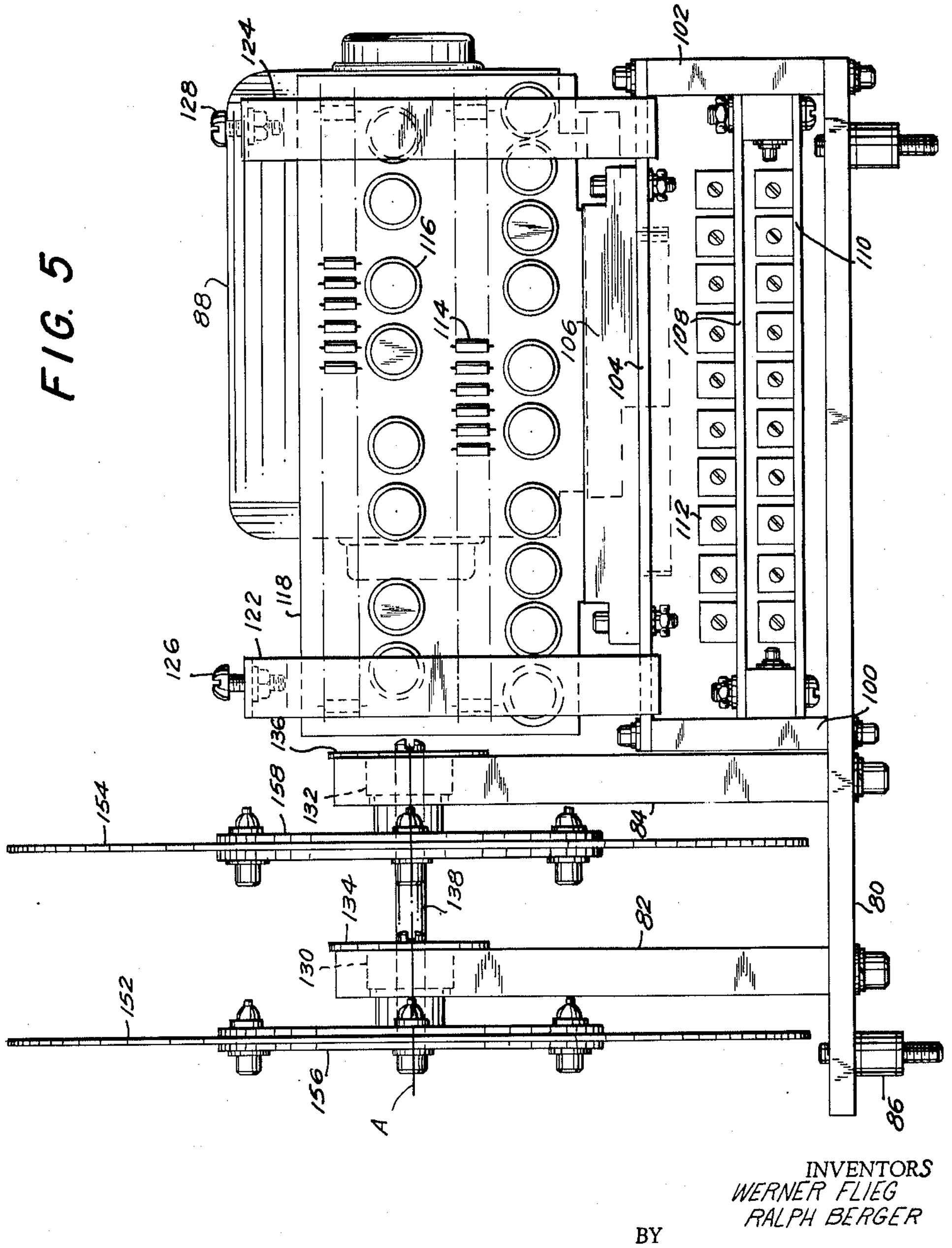
FIGURE 5 is a side view of the apparatus of FIG. 3.
Figure 7:
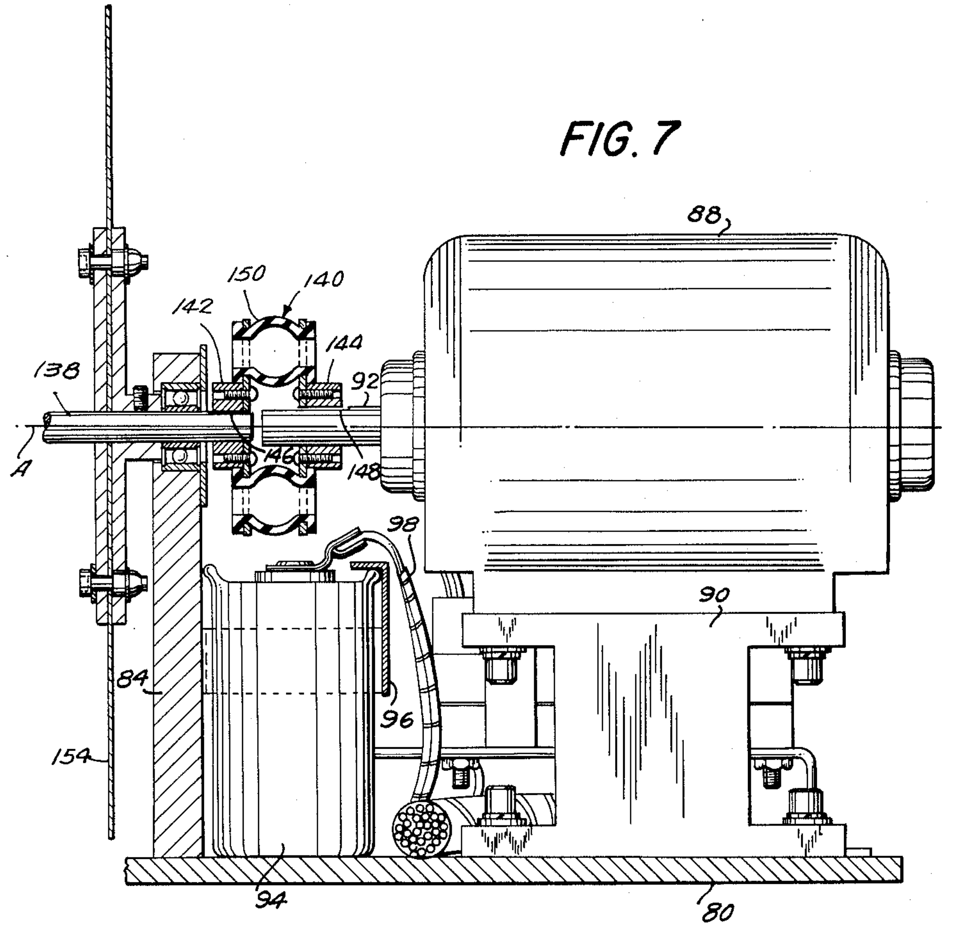
FIGURE 7 is a partially cross-sectional, partially broken away view of the apparatus of FIGS. 4–6.

The motor consists of a motor casing 88 mounted on a support bracket 90 and including a rotatable shaft 92 (omitted in FIG. 5). The motor may be of any conventional type, but is preferably an alternating current synchronous motor rotated at a speed, for example, of 3600 r.p.m. A motor capacitor 94 is provided which is fastened to vertical plate 84 by means of a bracket 96, the capacitor being coupled to the motor electrically by means of lines 98.

Also mounted on bottom plate 80 are supports 100 and 102 bearing a cross plate 104 upon which is supported multi-contact sockets 106.

Also connected to supports 100 and 102 are cross plates 108 and 110 carrying, for example, a plurality of potentiometers 112.

Aside from the potentiometers 112, there are provided a plurality of resistors 114 and transistors 116 which, in addition to various other components, constitute the various electrical circuits indicated above. These circuits will not be described in further detail as they are considered to be within the scope of those skilled in the art to provide.

As a feature of the invention, however, said components are mounted on a plurality of boards 118 and 120 so as to constitute compact units involving well known printed circuit techniques. Said boards are received in the sockets 106 whereat they are held by means of clamping brackets 122 and 124. They are firmed in position by means of adjustable screws 126 and 128.

Vertical plates 82 and 84 are provided with bearings 130 and 132 which are in coaxially aligned relationship. The bearings are held in suitable openings in plates 82 and 84 by means of retaining plates 134 and 136. In addition to being coaxial with one another, said bearings 130 and 132 are further coaxial with shaft 92 of the aforesaid motor.

A shaft 138 extends through plates 82 and 84 and is rotatably accommodated in bearings 130 and 132. Shaft 138 is therefore coaxial with the aforesaid shaft 92.

A connector 140 mechanically connects these two shafts and consists of connecting elements 142 and 144 keyed into grooves 146 and 148 in the facing ends of the respective shafts. Connector 140 further comprises resilient elements 150 functionally positioned in series between said shafts whereby the coupling is rendered flexible to avoid damage to the various components connected thereto.

Mounted on shaft 138 in axially spaced relation are discs 152 and 154 constituting the major elements of the aforesaid coding members. Said discs are detachable from the shaft 138 to which they are respectively connected by connecting elements 156 and 158. Each disc is provided with radial alignments 160 of holes in coded arrangement as will be discussed in greater detail hereinafter.

The aforesaid photoelectric devices consist of a set or series 162 of light sources or lamps 164 maintained in rectilinear alignment by a bracket 166 and a set or series 168 of light responsive devices or photoelectric cells 170 held in rectilinear alignment by means of a bracket 172. The set of lamps is in opposed relationship with the set of photoelectric cells and is spaced therefrom to define a gap or space 174 within which the disc 152 is displacedly accommodated. The rectilinear alignments of lamps and photoelectric cells are in this preferred embodiment of the invention radially disposed with respect to the axis A of shaft 138.

A set 176 of rectilinearly aligned lamps or light sources 178 constitutes a part of the other photoelectric device. It is opposed by a set 180 of light responsive devices or photoelectric cells 182 also in rectilinear alignment and spaced from set 176 to define a gap or space 184 in which disc 154 is rotatably accommodated. Sets 176 and 180 are also radially disposed relative to axis A for a purpose which will hereinafter become apparent.

Figure 4:
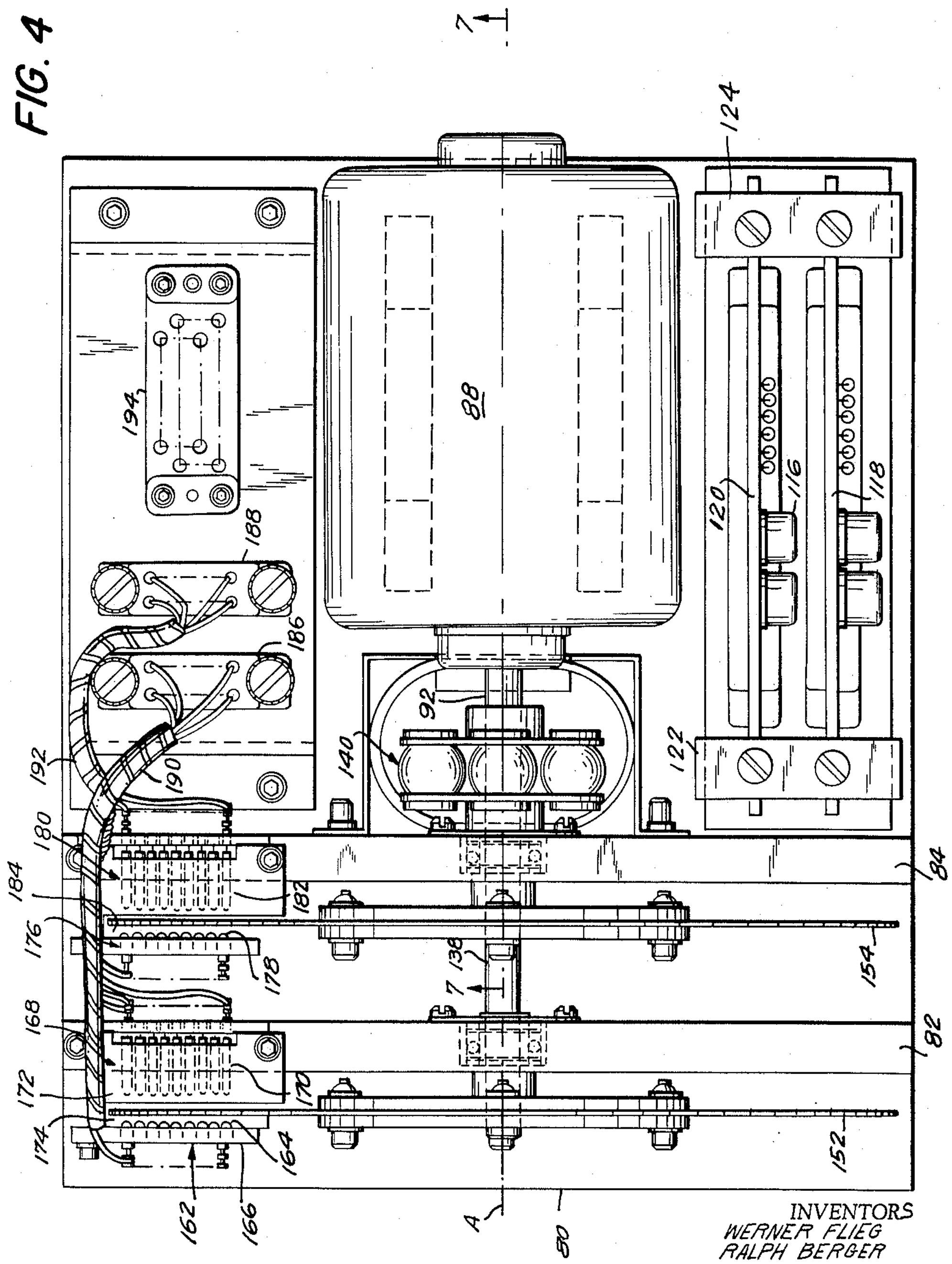
FIGURE 4 is a top view of the apparatus of FIG. 3.

Illustrated in FIG. 4 are electrical connectors 186 and 188. Lines connected to connector 186 are joined in a cable 190 which supplies electrical power to lamps 164 and is connected to photoelectric cells 170. The lines connected to connector 188 are joined in a cable 192 which provides electrical power to the lamps 178 and is connected to photoelectric cells 182.

A further electrical connector 194 is illustrated and constitutes by way of example the component by means of which electrical power is supplied to the aforesaid motor and the means by which input signals are introduced to the apparatus for code conversion as well as the means by which output signals may be derived from said apparatus.

Figure 6:
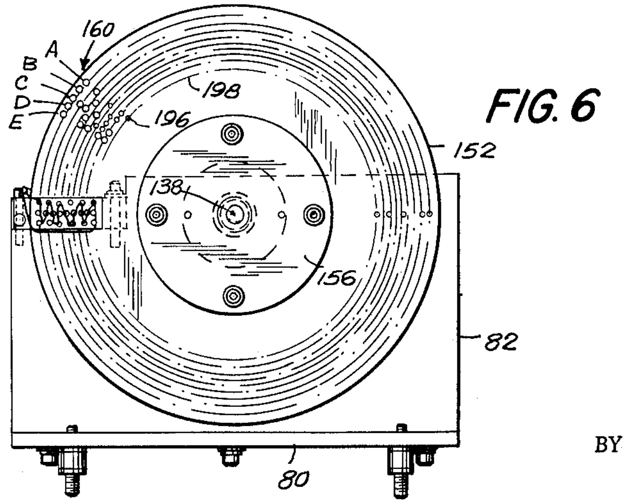
FIGURE 6 is an end view of the apparatus of FIG. 3.

As is best seen in FIG. 6 and as noted above, each disc is provided with a plurality of holes 196 disposed in radial alignments 160. Each alignment is adapted to represent a character. For example, in FIG. 6 are illustrated alignments A, B, C, D and E, each alignment representing the reference character assigned thereto.

The holes in each alignment are disposed at different radial distances from the axis of the associated disc. The presence and/or absence of holes at the different distances indicated by the concentric imaginary circle 198 are intended in combination to represent the associated character in a predetermined code. The representation of such characters in, for example, a binary code, is believed to be well known to those skilled in the art and is not believed to require further explanation in this text.

It will be appreciated from what has been noted above that at any given time only one alignment of the aforesaid holes can be interposed between the associated lamps and photoelectric cells such that the lamps of a given set will be selectively isolated from or exposed to the opposed photoelectric cells at a given time. This provides for encoding a character in the form of electrical signals by the use of photoelectric techniques.

Assuming that a disc of the nature hereinabove described is rotated on its axis and is interposed in the above described manner between a plurality of photoelectric cells and light sources, there will be generated in sequence groups of parallel signals, each group representing a character and corresponding to the holes in the disc causing the signals to be generated. Consequently each of discs 152 and 154 represents in combination with the associated photoelectric devices a means for cyclically generating a sequence of characters represented in the form of a sequence of electrical signals.

The invention utilizes the aforegoing apparatus and principles for the purpose of code conversion. To accomplish this, the invention provides for encoding the discs in two different codes. For example, the disc 154 is coded according to the code in which the incoming signals are encoded, whereas the disc 152 is encoded according to the code into which conversion is desired.

As will be shown hereinunder, this provides for the ready conversion from one code system into the other and, moreover, provides for ready adaptability to different codes since the discs mentioned above may be readily replaced by other discs encoded in still further codes.

Assuming that the motor is being operated and shaft 92 is being rotated at a constant predetermined speed, shaft 138 and discs 152 and 154 thereon will also be rotated at said constant speed. Disc 154 will selectively shield and expose photoelectric cells 182 with respect to light sources 178 and will cause the generation of a sequence of electrical signals directly corresponding to the coded combination of holes in this disc.

According to the electrical circuits generally indicated hereinabove, these electrical signals will be sequentially compared with an incoming signal representing a specific character in the same code and when an identity is detected in coincidence circuit 44 (FIG. 2) a control signal will be transmitted via line 58 to output circuit 50.

In the meantime and in fixed time relationship with the aforesaid operation, disc 152 will be causing photoelectric cells 170 to be generating a plurality of signals in groups each representing characters according to the coded arrangement of holes on disc 152. The signals, however, will be generated according to the different code associated with disc 152. Assuming that the characters on the two discs have a fixed geometrical relationship, a predetermined character represented in the form of electrical signals is being transmitted via line 20 to output circuit 50 when identity is indicated by a coincidence circuit 44. This predetermined signal will be the signal which will be gated through output circuit 50 by the signal on line 58 and which will ultimately arrive at and be used in utilization device 56.

More particularly, assuming that the input signal provided by source 14 is, for example, the electrical signal representing the letter G in the code employed by disc 154, the coincidence circuit 44 will indicate by providing a signal on line 58 the precise time at which the corresponding signal is received via line 18 and thus the time at which disc 154 is appropriately positioned to generate such a signal. This concomitantly indicates that disc 152 is at a position to cause the generation of a signal representing the letter G in the second code and permits the transmission of this latter signal to utilization device 56.

It will be understood that the most convenient geometrical relationship between the discs 152 and 154 is the arrangement whereby radial alignments of holes for the same character are directly and axially opposed. It is to be understood, however, that angular displacement between the radial alignments on the respective discs is possible provided that this is taken into account by appropriate angular displacement between the corresponding photoelectric device.

It will be, moreover, understood that radial alignments of holes have been illustrated for purposes of example only and that it is possible to use other than radial alignments while practicing the principles of the invention.

From the above it will be appreciated that the invention provides for conversion of electrical signals in one code to electrical signals of another code in a manner which is both facile and economical.

It will also be appreciated that the invention provides for maintaining reliability in the sense that the likelihood of errors is reduced to a minimum and in that the apparatus of the invention is susceptible of operation over prolonged periods of time without failure.

There will now be obvious to those skilled in the art many modifications and variations of the apparatus and techniques set forth. These modifications and variations will not, however, depart from the scope of the invention if defined by the following claims.

What is claimed is:

1. Apparatus comprising photoelectric means adapted to generate electrical signals, coded means operatively associated with said photoelectric means to cause the latter to generate continuously a sequence of signals constituting representations of a sequence of characters coded according to a first code, second photoelectric means adapted to generate electrical signals, second coded means operatively associated with said second photoelectric means to cause the latter to generate continuously a sequence of signals representing said sequence of characters coded according to a second code, said coded means being operatively coupled to cause said photoelectric means to generate simultaneously respective signals representing the same character according to the respective codes, control means coupled to both said photoelectric means and adapted to compare the signals of said second photoelectric means with an externally applied electrical signal representing one of said characters in said second code and upon identity thereof to pass the corresponding signal received from the first said photoelectric means, and utilization means coupled to and receiving said corresponding signal.

2. For use with electrical signals representing information in a first binary code, apparatus comprising a rotatable shaft, a first set of fixed light sources extending radially of said shaft, a first set of fixed light responsive devices facing said set of light sources and defining a gap therewith, said light responsive devices being adapted to generate electrical signals upon exposure to said light sources, a disc of light impermeable material on said shaft for rotation therewith, said disc extending between said light sources and light responsive devices, said disc being provided with a plurality of radial alignments of holes each adapted for exposing one of said light responsive devices to one of said light sources, the holes in each radial alignment being arranged in accordance with said first binary code to represent a specific character, comparison means adapted to receive the first said electrical signals and coupled to said first set of light responsive devices and adapted to generate a signal in response to coincidence between the first said signals and signals received from said devices, second sets of fixed light sources and fixed light responsive devices aligned radially with respect to said shaft, a second disc on said shaft and positioned between the sources and devices of said second set, said second disc being provided with a plurality of radial alignments of holes arranged in accordance with respective characters represented in a secondary binary code, each radial alignment of holes on one disc having a predetermined relationship with the radial alignment of holes representing the same character on the other disc, said first and second sets of light sources and light responsive devices also having said predetermined relationship, and gating means coupled to said comparison means and light responsive devices of said second set and being adapted to pass signals from the latter said devices upon receiving a signal from said comparison means.

3. For use with a source of electrical signals representing information in a first binary code, apparatus comprising a motor, a shaft rotated by said motor, a first set of light sources in a rectilinear alignment extending radially of said shaft, a first set of light responsive devices in a rectilinear alignment facing the first said alignment and defining a gap therewith, said light responsive devices being adapted to generate electrical signals upon exposure to said light sources, a disc on said shaft for rotation therewith, said disc extending between said light sources and light responsive devices and being adapted to isolate the same, said disc being provided with a plurality of radial alignments of holes each adapted for exposing one of said light responsive devices to one of said light sources, the holes in each radial alignment being arranged in accordance with said first binary code to represent a specific character, comparison means coupled to said source of electrical signals and to said first set of light responsive devices and adapted to generate a signal in response to coincidence between signals received from the latter said source and devices, second sets of light sources and light responsive devices aligned radially with respect to said shaft, a second disc on said shaft, said second disc being provided with a plurality of radial alignments of holes arranged in accordance with respective characters represented in a second binary code, means detachably fixing the second disc to the shaft, each radial alignment of holes on one disc having a predetermined relationship with the radial alignment of holes representing the same character on the other disc, said first and second sets of light sources and light responsive devices also having said predetermined relationship, and gating means coupled to said comparison means and light responsive devices of said second set and adapted to pass signals from the latter said devices upon receiving a signal from said comparison means.

4. A code converter comprising a source of electrical signals representing information in a first binary code, a synchronous motor including a shaft, a second shaft in coaxial relation with the first said shaft, a flexible coupling connecting said shafts whereby said second shaft is rotated by said motor, a first set of light sources in a rectilinear alignment extending radially of said second shaft, a first set of light responsive devices in a rectilinear alignment facing the first said alignment and defining a gap therewith, said light responsive devices being adapted to generate electrical signals upon exposure to said light sources, a disc on said second shaft for rotation therewith, said disc extending through said gap between said light sources and light responsive devices and being adapted to isolate the same, said disc being provided with a plurality of radial alignments of holes each adapted for exposing one of said light responsive devices to one of said light sources, the holes in each radial alignment being arranged in accordance with said first binary code to represent a specific character, control means coupled to said source of electrical signals and to said first set of light responsive devices and adapted to generate a signal in response to coincidence between signals received from the latter said source and devices, second axially spaced sets of light sources and light responsive devices aligned radially with respect to said second shaft and defining a gap therebetween, a second disc on said second shaft and extending through the latter said gap, said second disc being provided with a plurality of radial alignments of holes arranged in accordance with respective characters represented in a second binary code, means detachably fixing the second disc to the second shaft, each radial alignment of holes on one disc having a predetermined relationship with the radial alignment of holes representing the same character on the other disc, said first and second sets of light sources and light responsive devices also having said predetermined relationship, and means coupled to said control means and light responsive devices of said second set and being responsive to a signal from said control means to pass signals from the latter said devices.

5. A code converter comprising a source of electrical signals representing information in a first binary code, a base, a synchronous motor on said base and including a horizontal shaft, a bearing supported on said base, a second horizontal shaft supported in said bearing in coaxial relationship with the first said shaft, a flexible coupling connecting said shafts whereby said second shaft is rotated by said motor, a first set of light sources in a rectilinear alignment extending radially of said second shaft, a first set of light responsive devices in a rectilinear alignment facing the first said alignment and defining a gap therewith, said light responsive devices being adapted to generate electrical signals upon exposure to said light sources, a circular disc on said second shaft, means detachably fixing said disc to said second shaft for rotation therewith, said disc extending through said gap between said light sources and light responsive devices and being adapted to isolate the same, said disc being provided with a plurality of radial alignments of holes each adapted for exposing one of said light responsive devices to one of said light sources, the holes in each radial alignment being arranged in accordance with said first binary code to represent a specific character, control means coupled to said source of electrical signals and to said first set of light responsive devices and adapted to generate a signal in response to coincidence between signals received from the latter said source and devices, second axially spaced sets of light sources and light responsive devices aligned radially with respect to said second shaft and defining a gap therebetween, a second circular disc on and concentric with said second shaft and extending through the latter said gap, said second disc being provided with a plurality of radial alignments of holes arranged in accordance with respective characters represented in a second binary code, means detachably fixing the second disc to the second shaft, each radial alignment of holes on one disc having a predetermined relationship with the radial alignment of holes representing the same character on the other disc, said first and second sets of light sources and light responsive devices also having said predetermined relationship, and gating means coupled to said control means and light responsive devices of said second set and adapted to pass signals from the latter said devices upon receiving a signal from said control means.

References Cited by the Examiner

UNITED STATES PATENTS

| | | | |
|---|---|---|---|
| 2,436,178 | 2/1948 | Rajchman | 340—347 |
| 3,020,531 | 2/1962 | Appleton | 340—347 |

MALCOLM A. MORRISON, *Primary Examiner.*